United States Patent [19]
Sugiyama

[11] Patent Number: 5,819,018
[45] Date of Patent: Oct. 6, 1998

[54] IMAGE DATA CONVERTING METHOD AND IMAGE PROCESSING APPARATUS

[75] Inventor: Mitsumasa Sugiyama, Kawasaki, Japan

[73] Assignee: Canon Kabushiki Kaisha, Tokyo, Japan

[21] Appl. No.: 249,192

[22] Filed: May 26, 1994

Related U.S. Application Data

[62] Division of Ser. No. 575,863, Aug. 31, 1990, abandoned.

[30] Foreign Application Priority Data

Sep. 5, 1989 [JP] Japan ................................. 1-229786
Sep. 5, 1989 [JP] Japan ................................. 1-229787
Sep. 5, 1989 [JP] Japan ................................. 1-229790
Jan. 25, 1990 [JP] Japan ................................. 2-13584

[51] Int. Cl.$^6$ ................................................. G06F 15/00
[52] U.S. Cl. .......................................................... 395/131
[58] Field of Search .................................. 395/131, 129; 358/80, 332, 334; 345/150, 153, 154, 155

[56] References Cited

U.S. PATENT DOCUMENTS 5,018,085 5/1991 Smith, Jr. ................................. 364/526
5,157,741 10/1992 Katayama ................................. 382/54
5,222,206 6/1993 Liao ......................................... 395/131
5,264,927 11/1993 Miyoshi et al. ......................... 358/527
5,289,565 2/1994 Smith et al. ............................. 395/131
5,315,694 5/1994 Kasano .................................... 395/131
5,333,243 7/1994 Best et al. ............................... 395/109

FOREIGN PATENT DOCUMENTS 0153167 8/1985 European Pat. Off. .
3816780 12/1988 Germany .

Primary Examiner—Phu K. Nguyen
Attorney, Agent, or Firm—Fitzpatrick, Cella, Harper & Scinto

[57] ABSTRACT

A color image data processing apparatus and method for inputting color image data of a first color space, selecting representative color image data of a second color space which differs from the first color space in accordance with the input color image data, converting the representative color image data into color image data of the first color space, and computing errors between the input color image data and the representative color image data by using the color image data obtained by the conversion.

9 Claims, 13 Drawing Sheets

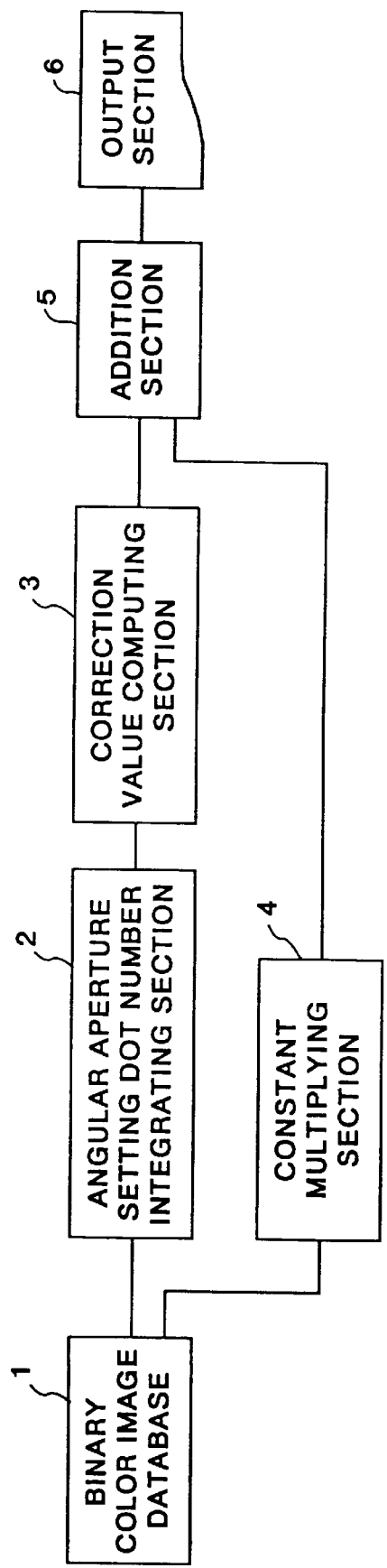
F I G. 1

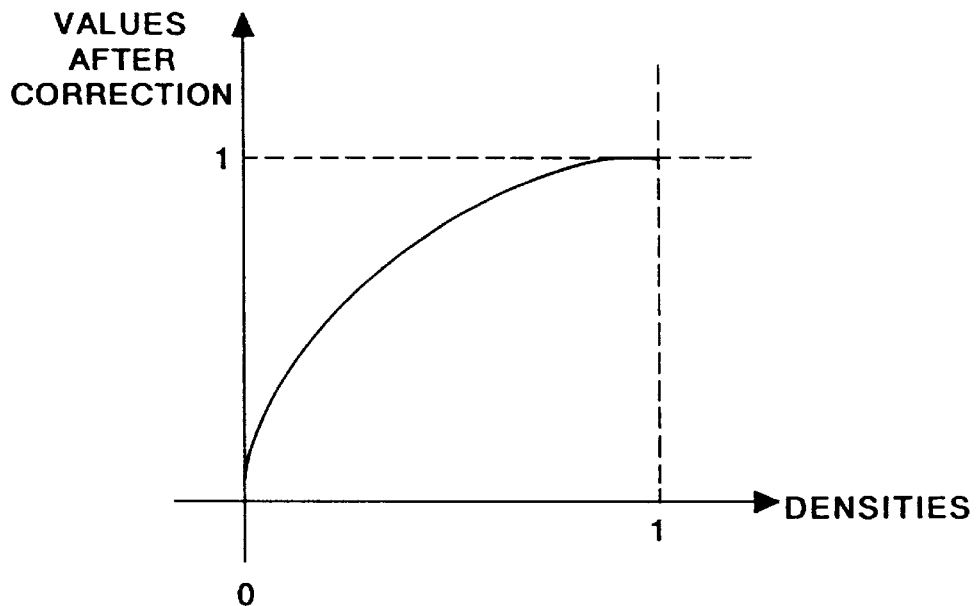
F I G. 2
| THE NUMBER OF DOTS | CORRECTION VALUES |
|---|---|
| 0 | 0 |
| 1 | 10 |
| 2 | 15 |
| 3 | 25 |
| 4 | 30 |
| 5 | 35 |
| 6 | 30 |
| 7 | 25 |
| 8 | 15 |
| 9 | 0 |
F I G. 3

| | | |
|---|---|---|
| 1 | 1 | 0 |
| 0 | 0 | 0 |
| 1 | 0 | 0 |

NOTICE PICTURE ELEMENT DATA    0
THE NUMBER OF DOTS    3
CORRECTION VALUE    25
OUTPUT VALUE    25

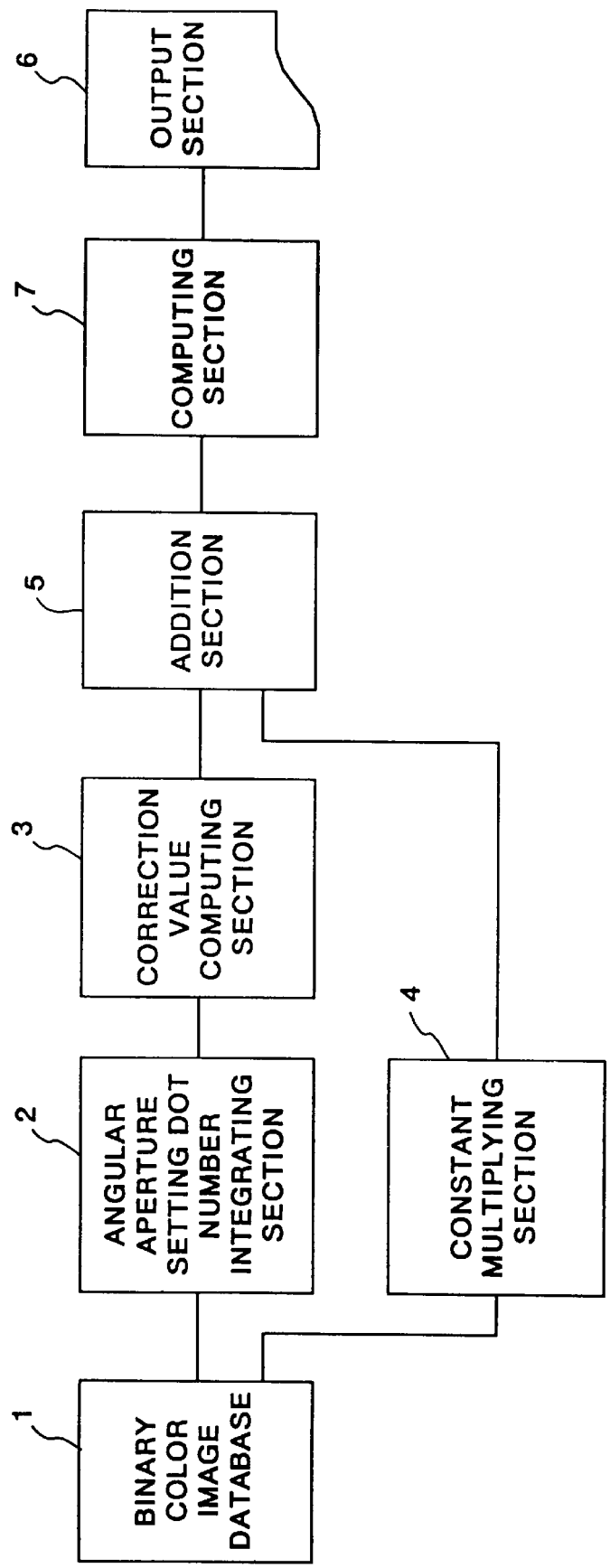
F I G. 6

|   |   |   |
|---|---|---|
| 1 | 1 | 0 |
| 0 | 1 | 0 |
| 1 | 0 | 0 |

FIG. 8

|     |     |   |
|-----|-----|---|
| 255 | 255 | 0 |
| 0   | 255 | 0 |
| 255 | 0   | 0 |

FIG. 9

| 255 | 255 | 30 |
|---|---|---|
| 40 | 255 | 0 |
| 255 | 0 | 0 |

F I G. 10

| 255 | 255 | 36 |
|---|---|---|
| 46 | 255 | 6 |
| 255 | 6 | 6 |

F I G. 11

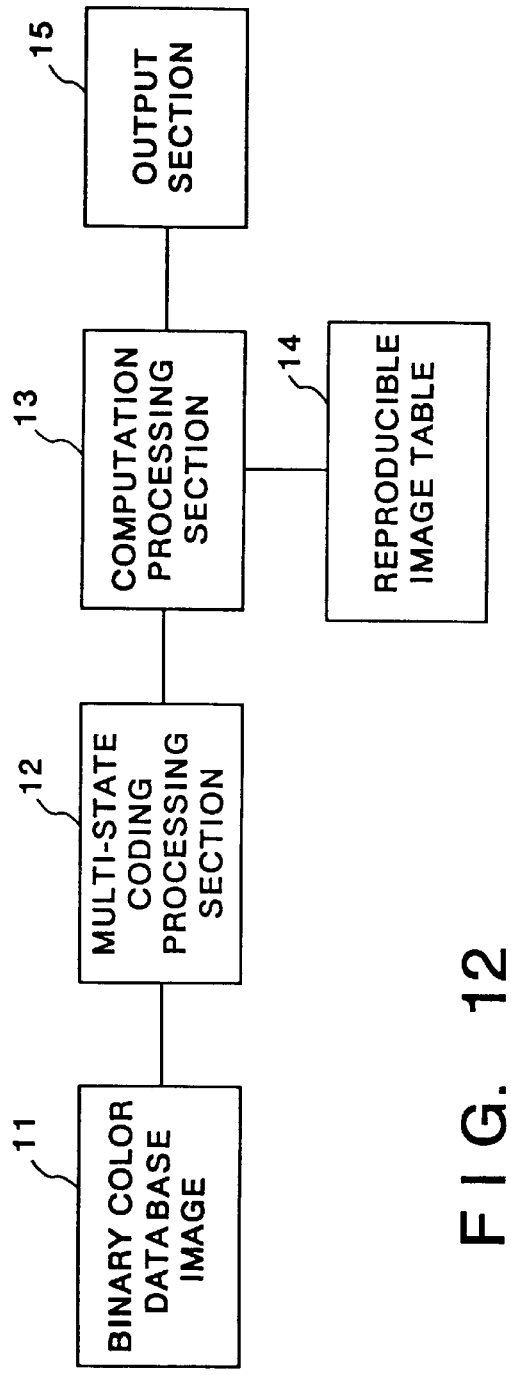
F I G. 12
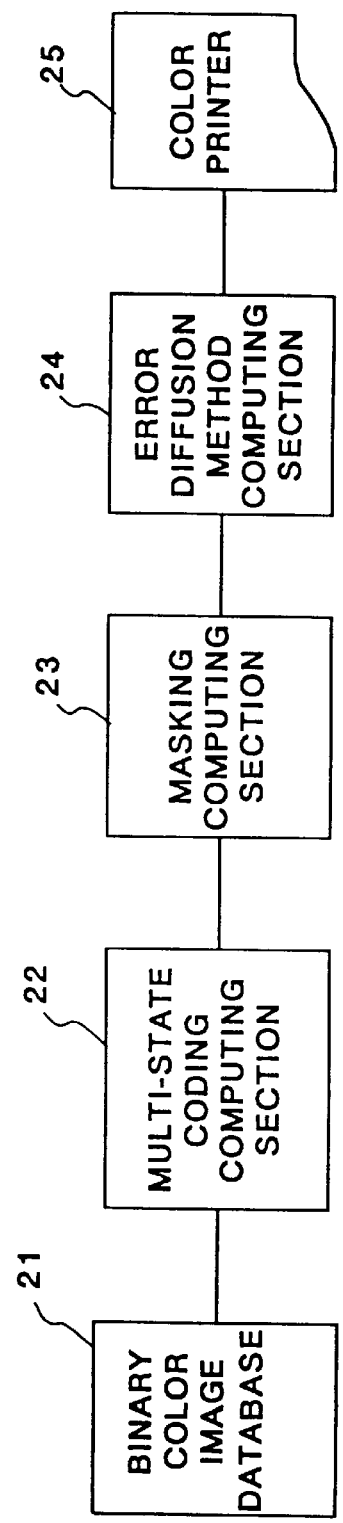
F I G. 18

```
   R   G   B           R    G    B
(  0   0   0 )  ⟶  (  0    0    0 )
(  0   0   1 )  ⟶  (  0    0  255 )
(  0   0   0 )  ⟶  (  0  255    0 )
         ⋮                  ⋮
(  1   1   1 )  ⟶  (255  255  255 )
```

```
   C   M   Y           R    G    B
(  1   1   1 )  ⟶  ( 10   15   20 )
(  1   1   0 )  ⟶  ( 20   10  200 )
(  1   0   1 )  ⟶  ( 30  200   40 )
         ⋮                  ⋮
(  0   0   0 )  ⟶  (190  200  220 )
```

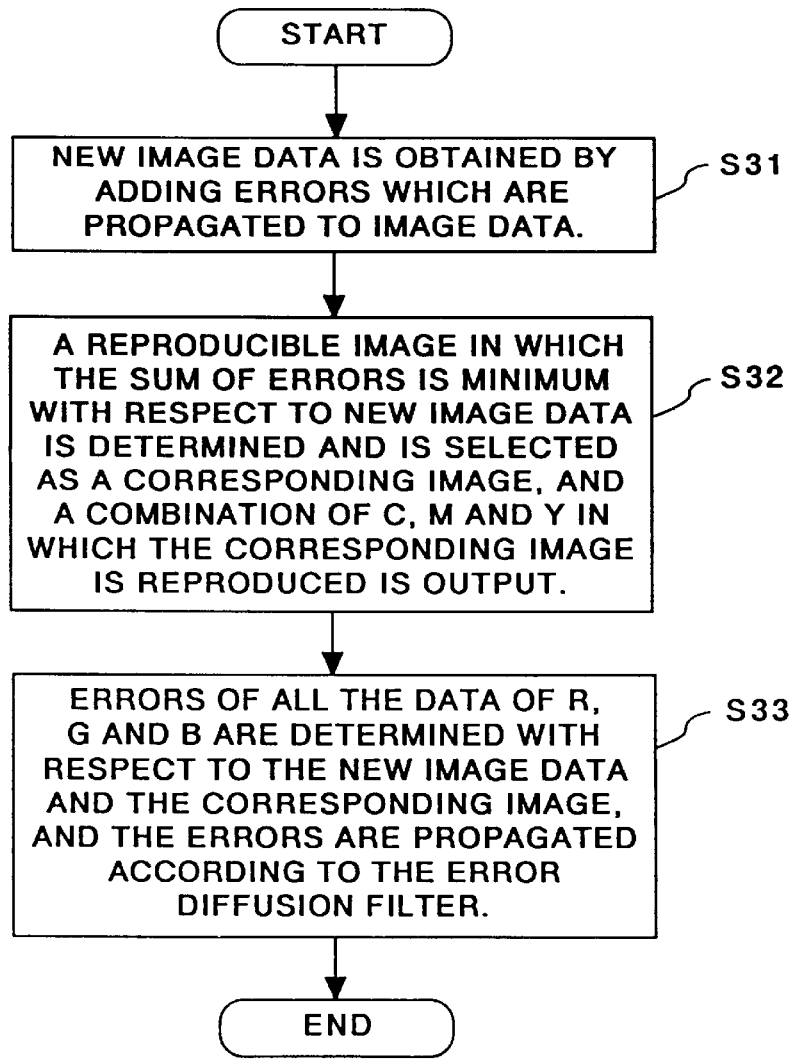
F I G. 16
| IMAGE DATA | ( R G B ) = ( 0 0 255 ) |
| ERRORS TO BE PROPAGATED | ( R G B ) = ( 10 20 -30 ) |
| NEW IMAGE DATA | ( R G B ) = ( 10 20 225 ) |
| CORRESPONDING IMAGE | ( R G B ) = ( 20 10 200 ) |
| ERRORS | ( R G B ) = ( -10 10 25 ) |
F I G. 17

IMAGE DATA CONVERTING METHOD AND IMAGE PROCESSING APPARATUS

This application is a division of application Ser. No. 07/575,863, filed Aug. 31, 1990 now abandoned.

BACKGROUND OF THE INVENTION

1. Field of the Invention

The present invention relates to an image data converting method which converts color or monochrome n-state (n bits per pixel) image data into m-state image data (where m>n). It also relates to an image processing apparatus, and more particularly to an image processing apparatus which image-processes multi-state image (i.e., non-binary) information where the image information is made binary.

2. Description of the Related Art

Conventionally, color image data stored in color image databases has basically utilized multi-state images. For example, all the picture elements of the multi-state image are represented by eight bits of each R (red), G (green), and B (blue).

Accordingly, when such image data is output on color printers, processes such as γ correction and masking are performed so as to modify the images to make them most suitable for the characteristics of the color printers where the images are to be output.

In such a case, however, the use of multi-state image data increases the volume of data, and is disadvantageous in terms of the memory capacities and the processing speed of the image database when the image database is constructed. Thus, to eliminate such disadvantages as described above, color image databases using binary data have gained attention.

That is, a binary color image is a color image in which the method makes a multi-state color image into a binary image. For instance, each picture element of the binary image is represented by one bit each of R, G and B, i.e., by a "0" or "1".

However, because such color image data is binary, it is impossible to perform processes, such as γ correction and masking, in the same manner as with the conventional one, before the binary color image data is modified and output so as to be most suitable for the characteristics of a color printer.

In other words, since the data is binary in, a "0" or "1" state, it is "0" it remains at a fixed value of "0" even though it is multiplied by an arithmetic coefficient. This results in a problem in that the data cannot be properly processed.

Particularly when a printer to which the data is output is a binary color printer, it is difficult to directly modify the binary color image data.

SUMMARY OF THE INVENTION

The present invention overcomes the foregoing problem. An object of the present invention is to provide an image data converting method which allows appropriate image processing by m-state-coding n-state image data (where m>n).

Another object is to provide an image processing apparatus which permits optimum image processing by multi-state-coding binary image information which has been input.

Other objects of the present invention will become apparent from the following drawings and the description of the preferred embodiments.

BRIEF DESCRIPTION OF THE DRAWINGS

FIG. 1 is a block diagram illustrating the structure of an image processing apparatus according to a first embodiment of the present invention;

FIG. 2 is a view illustrating the concept of γ correction, the correction being performed by a correction value computing section of the first embodiment;

FIG. 3 is a view illustrating a γ correction table for determining correction values by the correction value computing section of the first embodiment;

FIG. 6 is a block diagram showing the structure of an image processing apparatus according to a second embodiment of the present invention;

FIGS. 8 through 11 are schematic representations depicting examples in which picture elements are processed by the second embodiment;

FIG. 12 is a block diagram showing the structure of a color image printer according to a third embodiment of the present invention;

FIG. 16 is a flow chart illustrating the operation of a computation processing section in the third embodiment;

FIG. 17 is a schematic representation showing a specific example of a result of the computation processing in the third embodiment;

FIG. 18 is a block diagram showing the structure of an image processing apparatus according to a fourth embodiment of the present invention;

DETAILED DESCRIPTION OF THE PREFERRED EMBODIMENTS

Figures 4, 5:
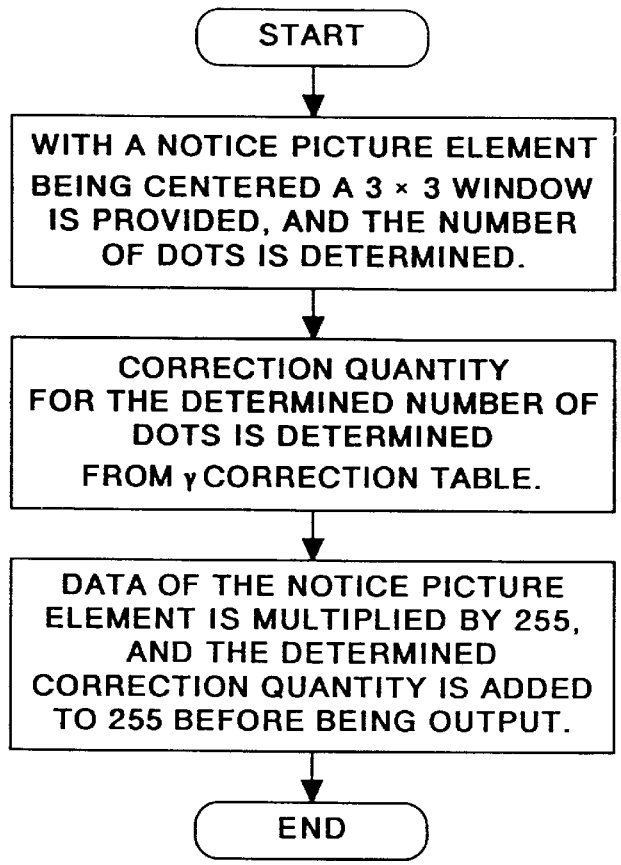
FIG. 4 is a flow chart illustrating the operation of the first embodiment.
FIG. 5 is a schematic representation showing a specific example of data, the data being processed by the first embodiment.

The preferred embodiments according to the present invention will be described hereinafter in detail with reference to the accompanying drawings.

[First Embodiment]

FIG. 1 is a block diagram illustrating the structure of a first embodiment of the present invention.

An image processing apparatus in accordance with this embodiment has a binary color image database 1, an angular aperture setting dot number integrating section 2, a correction value computing section 3, a constant multiplying section 4, an addition section 5, and an output section 6.

Binary color image data is stored in the binary color image database 1. In this embodiment, each picture element of the data is represented by one bit each of R (red), G (green), and B (blue). That is, each color component is represented by either a "0" or "1".

The angular aperture setting dot number integrating section 2 provides a predetermined window including a notice picture element, and counts the number of "1"s in the window. Counting the number of "1"s in such a manner is substantially the same as determining the average density.

Specifically, a 3×3 window is provided in this embodiment.

In the correction value computing section 3, a correction value is determined by the above counted number of "1"s or by the average density in which the counted number of "1"s is divided by the picture element number 9 of the window.

FIG. 2 is a graph illustrating the concept of γ correction, the γ correction being performed by the correction value computing section 3. The horizontal axis of the graph shows average densities, whereas the vertical axis shows values after the correction.

FIG. 3 is a view illustrating a γ correction table for determining correction values by the correction value computing section 3. Correction values for the number of dots (average densities) in the window are determined.

The correction value computing section 3 determines, based on the γ correction table, correction values corresponding to average densities.

The binary color image data is multiplied by a constant in the constant multiplying section 4. In this embodiment, the image data is multiplied by "255" and thus becomes "0" or "255", being represented by eight bits.

In the addition section 5, the correction value determined by the correction value computing section 3 is added to the image data determined by the constant multiplying section 4. The image data is then output in the output section 6.

FIG. 4 is a flow chart showing the overall operation of this embodiment.

First, the number of dots, that is, the number of "1"s, in the above-mentioned 3×3 window is determined, with the notice picture element (i.e., the pixel currently being processed) being centered (step S1). Next, a correction value for this number of dots is determined by the γ correction table (step S2). The data of the notice picture element is multiplied by "255", and the determined correction value is added to "255" before being output (step S3).

FIG. 5 is a schematic representation showing a specific example of data, the data being processed by this embodiment.

In this example, because the data value of the notice picture element is "0", and because the number of dots in the window is "3", the correction value becomes "25" from the γ correction table of FIG. 3. The output value is as follows:

0×255+25=25

The result thus obtained may be binarized further. As binarizing means, there are well-known methods, such as an error diffusion method and a systematic dither method. In this case, an image data converting method is utilized to convert multi-state image data into a binary image.

Although the γ correction is performed in the above embodiment, color modifications such as masking are also possible. In this case, the average density of each of R, G and B is determined by means of a predetermined window, and a masking computation is performed for each of the average densities. The differences between the densities before and after the masking computation are utilized as correction values.

Further, although in this embodiment binary color image data is input from a binary color image database, it may also be input from an image input device, such as a color scanner or a video camera, or through a telephone line or the like by means of a modem or the like, or it may be received by a television receiver.

Furthermore, though binary data is utilized for input data, three-state or four-state data can also be utilized for input data. The present invention may be applied to systems where data is converted into data whose bit number is larger than that of the input data.

Moreover, in this embodiment, the binary data having been input is multiplied by a constant "255". The present invention, however, is not limited to such multiplication. Numerical values may simply be replaced as follows:

"1" is replaced with "255", and "0" is replaced with "0".

As has been described, according to this embodiment, appropriate image processing can be effectively performed for n-state image data by the fact that data of each picture element of an n-state image is integrally multiplied in order to be m-state-coded, and that a correction value, which is obtained from the average density of surrounding picture elements by means of, for example, γ correction or masking, is determined and added to the m-state-coded data.

[Second Embodiment]

A second embodiment according to the present invention will now be described with reference to the drawings.

FIG. 6 is a block diagram showing the structure of an image processing apparatus according to the second embodiment of the present invention. As illustrated in FIG. 6, the image processing apparatus has a computing section 7 between the addition section 5 and the output section 6.

The computing section 7 determines whether or not image data is within a predetermined range, that is, within a range from and including "0" to and including "255". If the image data is out of the above range, excesses are divided into and added to surrounding picture elements before the image data is output. In this embodiment, when the image data exceeds the predetermined range, this means that not only a positive direction, but also a negative direction, is included. Excesses is intended to include positive values and negative values as well.

Figure 7A:
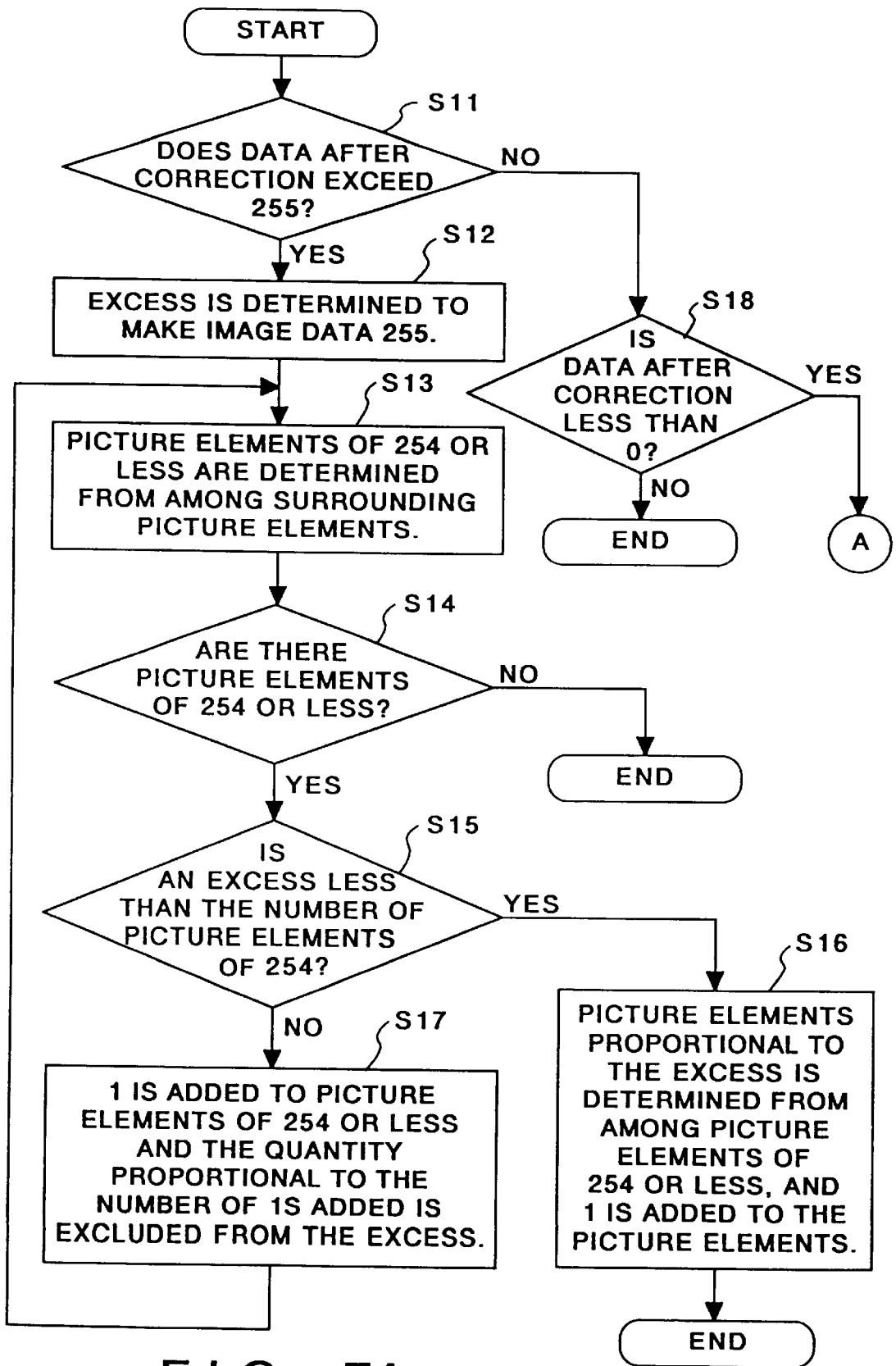
FIGS. 7A and 7B are flow charts showing the operation of a computing section according to the second embodiment.
Figure 7B:
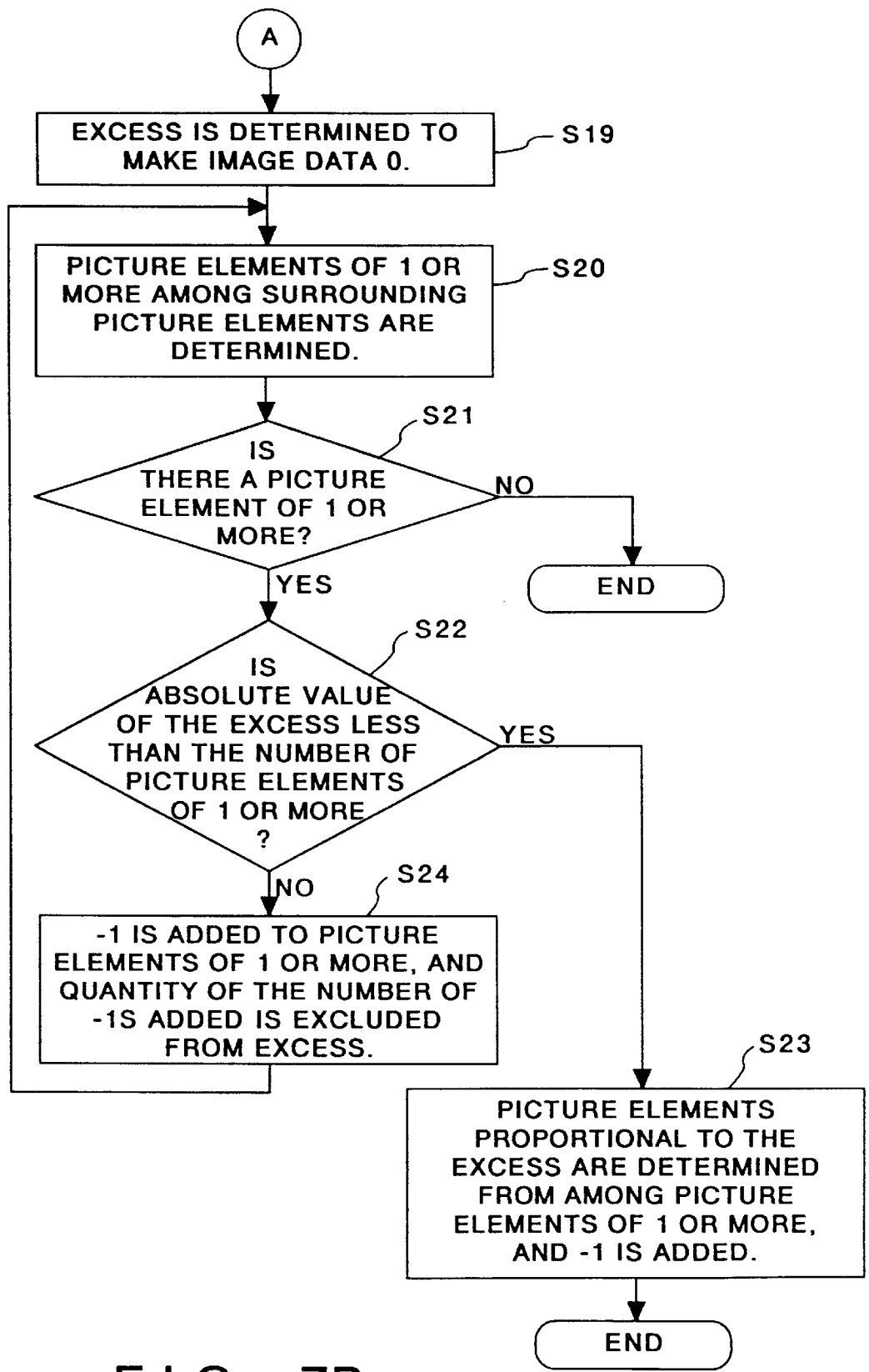

FIGS. 7A and 7B are flow charts showing the operation of the computing section 7 according to this embodiment.

First, it is determined whether or not the image data exceeds "255" after the above-described correction value has been added to the image data (step S11). If the image data exceeds "255", since it is out of the range, an excess is determined in order to make the image data "255" (step S12). Picture elements whose data is "254" or less are determined from among the picture elements around the notice picture element (step S13).

If there is no picture elements whose data is "254" or less (step S14), there is no picture elements to which an excess should be distributed. Then a program for the computing section 7 terminates.

Further, in step S14, if there are picture elements of "254" or less, it is determined whether or not an excess value is less than the number of picture elements of "254" or less (step S15). If the excess value is less than the number of picture elements of "254" or less, picture elements proportional to the excess value are selected from among all the picture elements of "254" or less, and "1" is added to the respective picture elements. The program for the computing section 7 terminates (step S16).

Furthermore, in step S15, if the excess value is more than picture elements of "254" or less, "1" is added to all picture elements of "254" or less, and the quantity proportional to the number of "1"s added is excluded from the excess. The logical sequence of the program for the computing section 7 returns to step S13. The same distribution operation as the above is repeated for the remaining excesses.

By the above process, when the picture element data exceeds "255" after a correction value is added, the picture element data becomes "255" and the excesses are distributed to surrounding picture elements as far as possible.

In step S11, if the data after the correction does not exceed "255", it is determined whether or not the data after the correction is less than "0" (step S18). If the data after the correction is less than "0", since it is out of the range from and including "0" to and including "255", the logical sequence proceeds to step S19, whereas if it is not less than "0", the program terminates since the data after the correction is within the range.

In step S19, the excess is determined in order to make the image data "0". In this case, however, the excess is a negative number.

Next, picture elements of "1" or more among the (object) picture elements around the notice picture element are determined (step S20). If there are no such picture elements (step S21), the program is completed because the excess cannot be distributed to the picture elements around the notice picture element.

Further, in step S21, if there are picture elements of "1" or more, it is determined whether or not the absolute value of the excess is less than the number of picture elements of "1" or more (step S22). If the absolute value is less than the number of picture elements of "1" or more, the only picture elements which are proportional to the absolute value of the excess are selected from among all the picture elements of "1" or more. "–1" is added to the image data of the picture elements thus selected (step S23). That is, if the excess is "–3", three picture elements of "1" or more are selected, and "1" is subtracted from the image data of each picture element.

In step S22, if the absolute value of the excess is more than the number of picture elements of "1" or more, "–1" is added to all the picture elements of "1" or more. The logical sequence returns to step S20, after the quantity of "–1"s added is excluded from the excess (step S24). In other words, if the excess is "31 10", and if there are four picture elements of "1" or more, "1" is subtracted from the image data of each picture element and "4" is added to the excess to make the excess "–6". The same process is repeated for the remaining excess "–6".

By the above process, when image data to which a correction value is added is less than "0", the image data is made "0", and at the same time the excess of the image data is excluded as much as possible from the surrounding picture elements.

The image data of each picture element thus falls within values from and including "0" to and including "255", and can be represented by eight bits. The image data neither overflows nor underflows.

FIGS. 8 through 11 are schematic representations depicting examples in which picture elements are processed by the second embodiment.

Figures 8, 9:
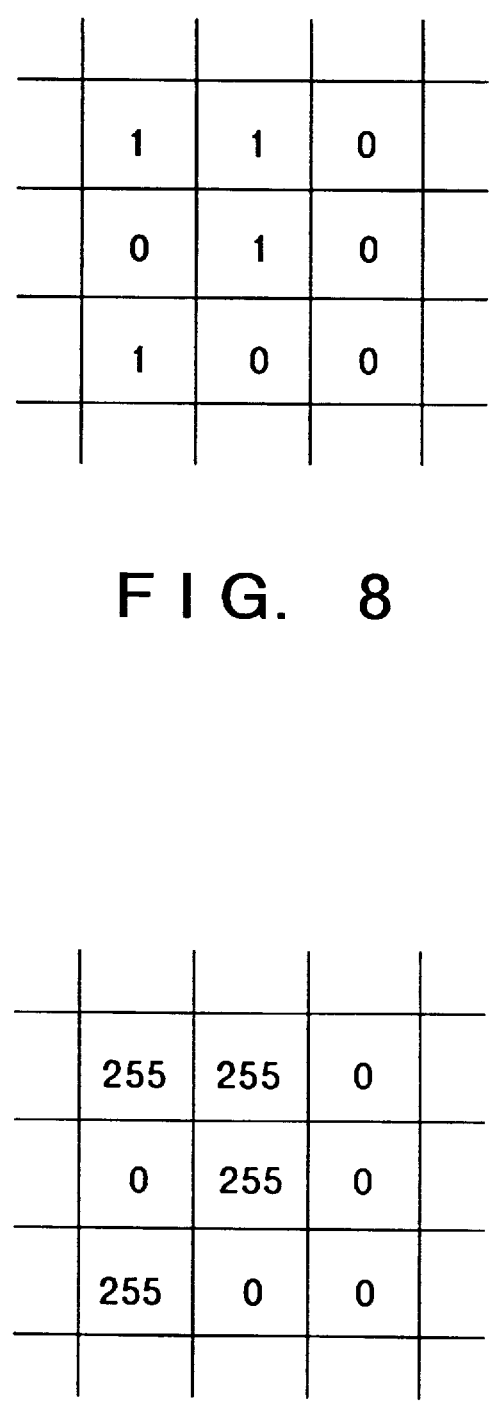

FIG. 8 shows part of the red image data of a body of binary color image data.

The notice picture element is a picture element at the center and the image data value thereof is "1". The number of dots in a 3×3 window is "4".

FIG. 9 illustrates a result in which all the image data is multiplied by "255". FIG. 10 illustrates the state where addition of a correction value and computing process have been halfway performed for the entire image. In FIG. 10, the processes have started with a picture element on the upper left corner, proceeding in the horizontal direction, and have finished with a picture element which is next to the notice picture element, that is, (which is to the left of the notice picture element).

In this embodiment, because the number of dots in the window is "4", the correction value of the notice picture element becomes "30" from the γ correction table of FIG. 3. "30" added to "255" makes "285". Therefore, the data value of this picture element exceeds "255" by "30", and "30" is divided and distributed to the surrounding picture elements.

FIG. 11 shows the image data after the excess is distributed.

Further, in the foregoing embodiment, eight picture elements included in the 3×3 window in which the notice picture element is centered are regarded as surrounding picture elements to which the excess should be distributed. However, for example, 24 picture elements included in a 5×5 window may be considered as surrounding picture elements to which the excess should be distributed. Furthermore, the notice picture element should not necessarily be centered in the window. For instance, eight picture elements included in a 3×3 window, with the notice picture element being positioned at the lower right corner of the window, may also be deemed as surrounding picture elements to which the excess is to be distributed.

In addition, although in this embodiment the excess is distributed as evenly as possible to the surrounding picture elements to which the excess should be distributed, the excess may be distributed according to priorities which are determined by, e.g., distances between the notice picture element and surrounding picture elements to which the excess should be distributed.

As has been explained, according to this embodiment, when m-state image data exceeds the predetermined range after a correction value in accordance with binary image data has been added, it is possible to perform appropriate image processing in which the m-state data neither overflows nor underflows, because the excess of the data is dispersed to surrounding picture elements.

[Third Embodiment]

A third embodiment according to the present invention will be described hereinafter with reference to the drawings.

FIG. 12 is a block diagram showing the structure of a color image printer according to the third embodiment.

As shown in FIG. 12, the color image printer has a binary color image database 11 in which color image data is stored while it is binarized, and a multi-state-coding processing section 12 which fetches the binary color image data from the binary color image database 11, and which multi-state-codes all the picture elements of the data. The color image printer further has a computation processing section 13 which selects optimum images from among reproducible images which are registered in a reproducible image table 14. The optimum images are selected for all the picture elements of multi-state color image data sent from the multi-state-coding processing section 12. The computation processing section 13 outputs the optimum images to an output section 15.

Figures 13, 14, 15:
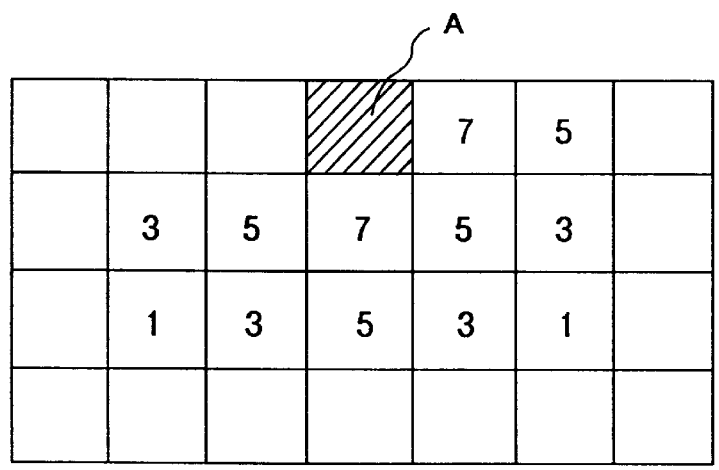
FIG. 13 is a schematic representation explaining a process performed by a multi-state-coding processing section according to the third embodiment.
FIG. 14 is a schematic representation illustrating an example of an error diffusion filter used in the third embodiment.
FIG. 15 is a schematic representation illustrating the structure of a reproducible image table used in the third embodiment.

FIG. 13 is a schematic representation explaining a process performed by the multi-state-coding processing section 12.

In each picture element of binary color image data in this embodiment, each pixel of data of each color component R, G and B is represented by either a "0" or "1". In the multi-state-coding processing section 12, each pixel of data of each color component R, G and B is simply multiplied by 255 and are represented by either "0" or "255". The "0" and "255" are the minimum and maximum values that can be represented by eight bits.

Further, in this embodiment, data which has been multi-state-coded by the multi-state-coding processing section 12 is processed by an error diffusion (or distribution) method, and new data for each picture element is determined.

FIG. 14 is a schematic representation illustrating an example of an error diffusion (or distribution) filter used in the above process.

In FIG. 14, a picture element indicated by slanted lines is a notice picture element which is now being computed. Numerical values denoted in picture elements around the notice picture element show error ratios which are propagated by the error diffusion method. For example, 7/48 of an error is propagated to a picture element in which "7" is denoted. No errors are propagated to blank picture elements.

As has been described, image data (a corresponding image) to be output is determined based on new picture element data of all the determined picture elements and on the contents of the reproducible image table 14.

FIG. 15 is a schematic representation illustrating the structure of the reproducible image table 14.

In the re-producible image table 14 of FIG. 15, combinations of three-color components C (cyan), M (magenta), and Y (yellow) of ink to be output by the output section 15 are registered in the left column, whereas each component value of R, G and B which is an output result is registered in the right column.

The output section 15 in this embodiment reproduces colors depending upon whether or not each color C, M and Y is output for each picture element.

For instance, when all colors C, M and Y are output, that is, in the case where (C, M, Y)=(1, 1, 1), a color can be reproduced in which the resulting component values of R, G and B are respectively 10, 15 and 20.

Thus, all combinations of component values of R, G and B, which the output section 15 can reproduce by the combinations of C, M and Y, are registered in the reproducible image table 14.

FIG. 16 is a flow chart illustrating the operation of the computation processing section 13, the operation being based on the above re-producible image table 14. FIG. 17 is a schematic representation showing a specific example of a result where a certain picture element has been subjected to the computation processing.

First, in FIG. 16, new image data is obtained by adding errors propagated by the error diffusion method to multi-state-coded image data of a notice picture element (step S31).

In the example illustrated in FIG. 17, because multi-state-coded image data of the notice picture element is data where (R, G, B)=(0, 0, 255), and because an error to be propagated is an error where (R, G, B)=(10, 20, −30), new image data is data where (R, G, B)=(10, 20, 225).

Next, optimum image data is selected from the reproducible image table 14 for this new image data and is output to the output section 15 (step S32).

In other words, in this embodiment, all the component values in the right column of the reproducible image table 14 are compared with all the component values of the new image data, and image data in which the sum of errors of all the component values is minimum is selected.

In the example shown in FIG. 17, image data in which the sum of errors is minimum for the new image data where (R, G, B)=(10, 20, 225) is an image where (R, G, B)=(20, 10, 200) from FIG. 15, so that this image is selected as a corresponding image, and a combination of three-color components where (C, M, Y)=(1, 1, 0) is output.

Next, errors of all the data R, G and B (corresponding errors) are determined for the new image data and the corresponding image, and the errors are propagated in accordance with the foregoing error diffusion filter (step S33).

In the example shown in FIG. 17, the corresponding error is an error where (R, G, B)=(−10, 10, 25) which is propagated in accordance with the error diffusion filter to surrounding picture elements.

As has been explained, in this embodiment, the multi-state-coded data is a value where data in which each picture element of binary color image data is multi-state-coded is added to error data which is propagated by the error diffusion method. The above error data is data where an error between an image selected by the output section 15 from among the reproducible images and the above multi-state-coded data, is determined, and where the error thus obtained is diffused and propagated by means of a one-dimensional or multi-dimensional filter. For these reasons, image data can be printed with a minimum of corresponding errors.

In this embodiment, though the output section 15 outputs three colors C, M and Y, it may also output four colors C, M, Y and K (black).

Further, in this embodiment, an image in which an error difference is minimum is utilized as a corresponding image. However, an image in which an average of the square of each error of R, G, B is minimum may also be utilized as a corresponding image.

Furthermore, in this embodiment, although color is represented by R, G and B color components, it may also be represented by using other color expressing methods, such that it is represented by X, Y and Z, or L*, a* and b*, after it has been converted from R, G and B. Also, color may be directly represented by X, Y and Z, or L*, a* and b*.

Moreover, in the multi-state code processing of this embodiment, although data of the color components R, G and B each is multiplied by 255 and a reproducible image is represented by eight bits, other bit lengths may also be utilized if the multi-state-coding and the reproducible image correspond to each other.

In addition, the output section 15 of this embodiment outputs each picture element, depending upon whether or not each color C, M and Y is output. However, the data of each color component C, M and Y may be multi-state coded. For instance, the data may be three-state coded such that each color C, M and Y is not output, or is output in a light color, or is output in a dark color. In the three-state case, a reproducible image can be represented in 27 ways, as 3×3×3=27.

Further, a corresponding image can be directly selected from among multi-state-coded images, without necessarily depending upon the above-described error diffusion method, and yet the image can be effectively printed.

As has been described, according to this embodiment, an appropriate image can be formed for n-state image data, because each picture element of the n-state image data is m-state-coded, and because the output section selects an appropriate image from among the possible reproducible images so as to correspond to the image.

[Fourth Embodiment]

A fourth embodiment according to the present invention will be described hereinafter with reference to the drawings.

<Explanation of Structure (FIG. 18)>

FIG. 18 is a schematic block diagram showing the structure of an image processing apparatus according to this embodiment. In FIG. 18, numeral 21 denotes a binary color image database in which is stored binary color image data, using a process to generate the binary value, such as a systematic dither method, which is not a density preservation type. In this embodiment, each picture element of a binary color image is represented by one bit of each of R, G and B, that is, by a "0" or "1".

Numeral 22 denotes a multi-state-coding computing section which inputs binary color image data from the binary color image database 21, and which multi-state-codes the binary color image for a masking computing section 23, which will be described later. Numeral 23 denotes the masking computing section which performs various image processes for color image data which has been binarized by the multi-state-coding computing section 22. Numeral 24 indicates an error diffusion method computing section. The error diffusion method computing section 24 in this embodiment diffuses errors to surrounding picture elements in order to perform a conversion process to binary where density preservation is possible. The errors occur while a notice picture element is make binary by means of the error diffusion method which is one of the conversion to binary methods of the well-known density preservation type. Numeral 25 indicates an output section, which is a color printer in this embodiment.

An unillustrated control section controls the above computing sections 22 through 24. The control section comprises components such as, a CPU for controlling the entire image processing apparatus, a ROM in which process steps (programs) executed by the CPU are stored, and a RAM including a work area, various tables and the like where the process steps of the ROM are used while being executed.

<Explanation of Process Steps (FIGS. 19 and 20)>

Figure 19:
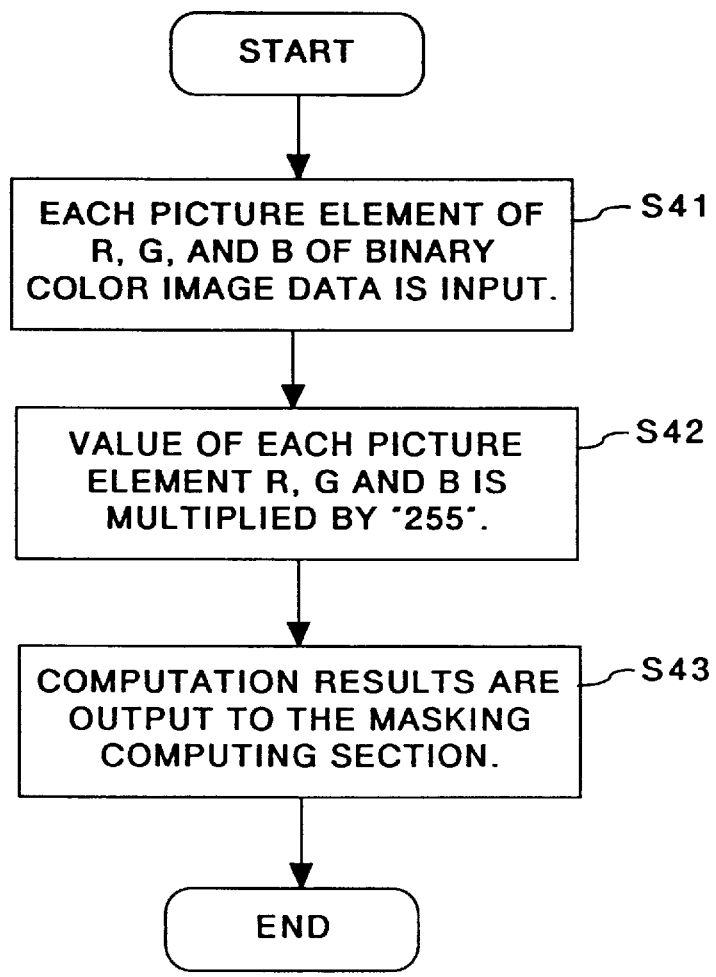
FIGS. 19 and 20 are flow charts showing process steps in the fourth embodiment.

Multi-state-coding process according to this embodiment will now be described with reference to the flow chart of FIG. 19.

First, in step S41, each picture element R, G and B (one bit for each) of binary color image data is input as desired from the binary color image database 21. The process then proceeds to the next step S42, where the bit value of each picture element of R, G and B is multiplied by "255". In other words, one bit of each picture element of R, G and B becomes eight bits, and the value of eight bits becomes either "0" or "255".

Next, for the binary color image data which has been input as desired, when the multi-state-coding process is completed, the process proceeds to step S43, in which R, G and B of multi-state image data are output to the masking computing section 23. The process then terminates.

With the above process, the multi-state-coding process for the binary color image data according to this embodiment has been completed. The masking computing section 23 performs a process most suitable for the characteristics of the color printer 25.

Figures 20, 21:
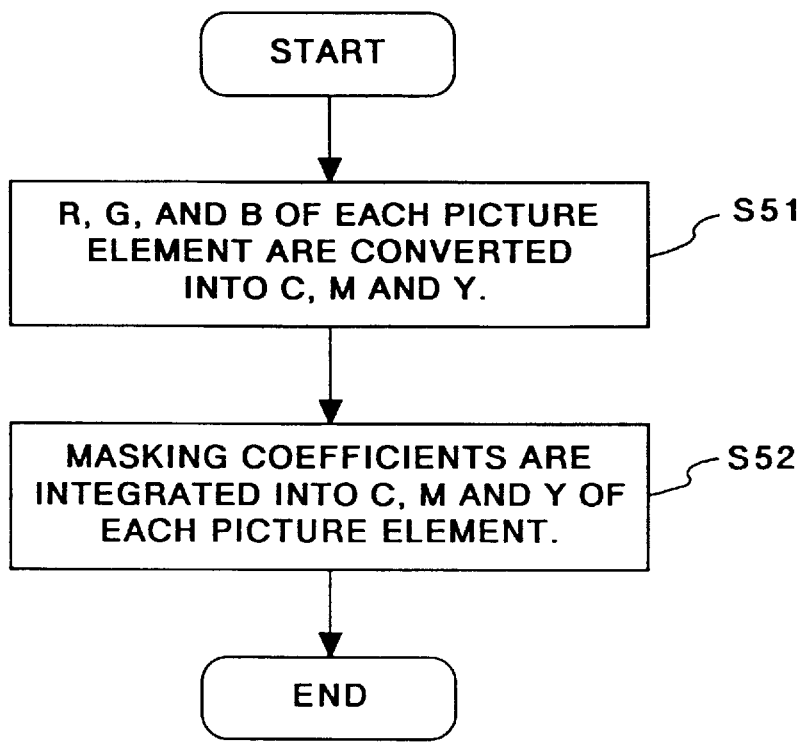
FIG. 21 is a view explaining masking patterns.

FIG. 20 is a flow chart illustrating a process in the masking computing section 23.

First, in step S51, each picture element of eight-bit R, G and B which is output from the multi-state-coding computing section 22 is logarithmically converted into C (cyan), M (magenta), and Y (yellow), three of which correspond to the ink properties of the color printer 25. In this embodiment, since R, G and B are respectively eight bits, they are converted into C, M and Y by subtracting the values of R, G and B from "255". Next, the process proceeds to step S52, in which masking coefficients, e.g., as shown in FIG. 21, are integrated into the converted C, M and Y.

Further, each pixel of data of the computation-processed C, M and Y is made binary by the error diffusion method computing section 24, and the color printer 25 forms a permanent, visible image.

As has been explained, according to this embodiment, it is possible to obtain an image which has undergone an appropriate image processing because with regard to binary image data which has been made binary by a conversion to binary method, such as a systematic dither method, which is not a density preservation type, a multi-state original picture is image-processed by multi-state-coding it and is made binary by the conversion to binary method of the density preservation type.

In this embodiment, though binary data is output to the color printer 25, it may also be output to output devices, other than the color printer 25. For example, it may also be output to a CRT display, a liquid crystal display or the like. The binary data may also be stored again in the binary color image database 21, instead of outputting it to an output device of the outside.

Furthermore, in the above-mentioned multi-state-coding computing section 22, as a multi-state-coding method, the values of R, G and B of picture elements are multiplied by 255. In addition to the fact that the values are simply multiplied by 255 as described above, the multi-state-coding computing section 22 may also be constructed so that data is processed as the average value where surrounding picture elements are included. The values of R, G and B are not necessarily multiplied by 255, but may be multiplied by, for instance, 127, or other numerical values. Moreover, multi-state-coding methods of various types may also be combined, depending upon masking methods employed.

In this embodiment, although image data is made binary by means of the error diffusion method, it may also be made binary by other conversion to binary methods of the density preservation type, such as an average error minimum method. Further, the image data may also be made binary by the systematic dither method, which is not principally the density preservation type, so long as the data is modified so that the density thereof is preserved by such means as diffusing errors.

Furthermore, in this embodiment, though a binary color image is obtained from the binary color image data base, binary color image data may also be input from image input devices, such as a color scanner or a video camera.

Moreover, in this embodiment, although a binary color image is obtained from the binary color image database, binary color image data may also be received by a telephone line or the like to which a modem or the like is connected.

In this embodiment, although a binary color image is input from the binary color image database, binary color image data which is received by a television receiver may also be utilized.

As has been described above, according to the present invention, it is possible to appropriately image-process already input binary image information by multi-state-coding it.

Although the present invention has been described with reference to the Preferred Embodiments thereof, it will be understood that the present invention is not limited to the foregoing embodiments, and various modifications of the invention can be made within the scope of the claims.

What is claimed is:

1. A color image data processing method, comprising the steps of:

inputting m-state color image data of a first color space;

quantizing the m-state color image data of the first color space into n-state (where n<m) color image data of a second color space;

computing error between color represented by the m-state color image data and color represented by the n-state color image data; and diffusing the error to peripheral picture elements of the m-state color image data.

2. The method according to claim 1, wherein said first color space is RGB, XYZ, or L*a*b* space.

3. The method according to claim 1, wherein said quantizing step selects color image data representing color in which the error is minimum, from among colors which can be represented by n-state color image data.

4. The method according to claim 1, wherein said second color space is YMC space.

5. A color image data processing apparatus, comprising:

inputting means for inputting m-state color image data of a first color space;

quantization means for quantizing the m-state color image data of the first color space into n-state (where n<m) color image data of a second color space;

computing means for computing error between color represented by the m-state color image data and color represented by the n-state color image data;

diffusing means for diffusing the error to peripheral picture elements of the m-state color image data; and image forming means for forming color image based on the n-state color image data.

6. The apparatus according to claim 5, wherein said first color space is RGB, XYZ, or L*a*b* space.

7. The apparatus according to claim 5, wherein said quantization means selects color image data representing color in which the error is minimum, from among colors which can be represented by n-state color image data.

8. The apparatus according to claim 5, wherein said the second color space is YMC space.

9. The apparatus according to claim 5, further comprising:

a table for storing relations between the m-state color image data and n-state color image data, wherein said quantization means quantizes the m-state color image data by using said table.

* * * * *

UNITED STATES PATENT AND TRADEMARK OFFICE
`CERTIFICATE OF CORRECTION

PATENT NO. : 5,819,018

DATED : October 6, 1998

INVENTOR(S): MITSUMASA SUGIYAMA

It is certified that error appears in the above-identified patent and that said Letters Patent is hereby corrected as shown below:

COLUMN 1
Line 15, "image (i.e., non-binary)" should read --(i.e., non-binary) image--;
Line 21, "of each" should read --each of--;
Line 47, "binary in," should read --binary, in--;
Line 48, "it is "0,"" should read --if it is "0,"--.

COLUMN 4
Line 42, "is" should read --are--;
Line 55, "is" should read --are--;
Line 56, "is" should read --are--.

COLUMN 5
Line 45, ""31 10"," should read --"-10",--.

COLUMN 7
Line 6, "are" should read --is--;
Line 30, "re-producible" should read --reproducible--;

COLUMN 9
Line 32, "make" should read --made--.

UNITED STATES PATENT AND TRADEMARK OFFICE
CERTIFICATE OF CORRECTION

PATENT NO. : 5,819,018

DATED : October 6, 1998

INVENTOR(S): MITSUMASA SUGIYAMA

It is certified that error appears in the above-identified patent and that said Letters Patent is hereby corrected as shown below:

COLUMN 11
  Line 25, "the" should be deleted.

COLUMN 12
  Line 20, "the" should be deleted.

Signed and Sealed this

Twenty-first Day of December, 1999

Q. TODD DICKINSON

*Attest:*

*Attesting Officer*    *Acting Commissioner of Patents and Trademarks*